US012696250B2

(12) United States Patent
Chen et al.

(10) Patent No.: US 12,696,250 B2
(45) Date of Patent: Jul. 28, 2026

(54) METHOD AND APPARATUS FOR COLLISION HANDLING IN A WIRELESS COMMUNICATION SYSTEM

(71) Applicant: SAMSUNG ELECTRONICS CO., LTD., Suwon-si (KR)

(72) Inventors: Zhe Chen, Beijing (CN); Jingxing Fu, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/500,898

(22) Filed: Nov. 2, 2023

(65) Prior Publication Data

US 2024/0155586 A1      May 9, 2024

(30) Foreign Application Priority Data

Nov. 4, 2022    (CN) .......................... 202211380077.7

(51) Int. Cl.
*H04W 72/0453*      (2023.01)

(52) U.S. Cl.
CPC ................................ *H04W 72/0453* (2013.01)

(58) Field of Classification Search
CPC ................................................ H04W 72/0453
USPC ...................................................... 370/329
See application file for complete search history.

(56) References Cited

U.S. PATENT DOCUMENTS

| | | | |
|---|---|---|---|
| 2020/0221469 A1 | 7/2020 | Lee et al. | |
| 2022/0256583 A1 | 8/2022 | Wang et al. | |
| 2022/0322252 A1 | 10/2022 | Chen et al. | |
| 2024/0007914 A1* | 1/2024 | Zhou .............. | H04W 36/00835 |

FOREIGN PATENT DOCUMENTS

WO          2021133953 A1      7/2021

OTHER PUBLICATIONS

International Search Report and Written Opinion of the International Searching Authority dated Jan. 5, 2024, in connection with International Application No. PCT/KR2023/013671, 7 pages.
3GPP TS 38.213 V17.3.0 (Sep. 2022) Technical Specification; 3rd Generation Partnership Project; Technical Specification Group Radio Access Network; NR; Physical layer procedures for control; (Release 17); 260 pages.

* cited by examiner

*Primary Examiner* — Chi Tang P Cheng

(57) ABSTRACT

The present disclosure discloses a method and device in a wireless communication system, the method including: receiving configuration information for configuring multiple cells for a terminal device; and determining a reference cell for a first symbol according to a tenth cell from the multiple cells, or determining the reference cell for the first symbol according to a cell other than the tenth cell from the multiple cells, wherein the first symbol is configured as uplink in the tenth cell and at least one frequency-domain resource in the tenth cell is for a downlink transmission; or the first symbol is configured as downlink in the tenth cell and at least one frequency-domain resource in the tenth cell is for uplink transmission. The present disclosure improves the flexibility and reliability of the wireless communication system.

16 Claims, 10 Drawing Sheets

116

330
SPEAKER

325
RX PROCESSING CIRCUITRY

310
RF TRANSCEIVER

305

320
MICROPHONE

315
TX PROCESSING CIRCUITRY

345
I/O IF

340
PROCESSOR/CONTROLLER

350
INPUT DEVICE(S)

DISPLAY
355

360
STORAGE

OPERATING SYSTEM
361

APPLICATIONS
362 receive configuration information for configuring
multiple cells for a terminal device determine a reference cell for a first symbol according
to a tenth cell of the multiple cells, or determine the
reference cell for the first symbol according to other cells
except the tenth cell of the multiple cells

FIG.4 determine a first cell determine a behavior of the terminal device on
a first symbol according to the first cell and a second cell

METHOD AND APPARATUS FOR COLLISION HANDLING IN A WIRELESS COMMUNICATION SYSTEM

CROSS-REFERENCE TO RELATED APPLICATION

This application is based on and claims priority under 35 U.S.C. § 119 to Chinese Patent Application No. 202211380077.7 filed on Nov. 4, 2022, in the China National Intellectual Property Administration, the disclosure of which is incorporated by reference herein in its entirety.

BACKGROUND

1. Field

The present disclosure relates to the technical field of wireless communication, and more specifically, to a method and device in a wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

This summary is provided to introduce a selection of concepts, in a simplified format, that are further described in the detailed description of the present disclosure. This summary is neither intended to identify key or essential inventive concepts of the present disclosure nor is it intended for determining the scope of the present disclosure.

According to one embodiment of the present disclosure, a method performed by a user equipment (UE) in a wireless communication system, the method comprising: receiving configuration information for configuring multiple cells for the UE; and determining a reference cell for a first symbol according to one of a tenth cell from the multiple cells, wherein, in case that the first symbol is configured as an uplink in the tenth cell, at least one frequency-domain resource in the tenth cell is for a downlink reception.

According to another embodiment of the present disclosure, a method performed by a base station in a wireless communication system, the method comprising: determining configuration information for configuring multiple cells for a user equipment (UE); and transmitting the configuration information to the UE, wherein a tenth cell from the multiple cells is used to determine a reference cell for a first symbol, and wherein, in case that the first symbol is configured as an uplink in the tenth cell, at least one frequency-domain resource in the tenth cell is for a downlink transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

In order to illustrate the technical schemes of the embodiments of the present disclosure more clearly, the drawings of the embodiments of the present disclosure will be briefly introduced below. Apparently, the drawings described below only refer to some embodiments of the present disclosure, and do not limit the disclosure. In the drawings:

FIG. 4 illustrates a flowchart of a method for a collision handling according to various embodiments of the present disclosure;

DETAILED DESCRIPTION

Figure 1:
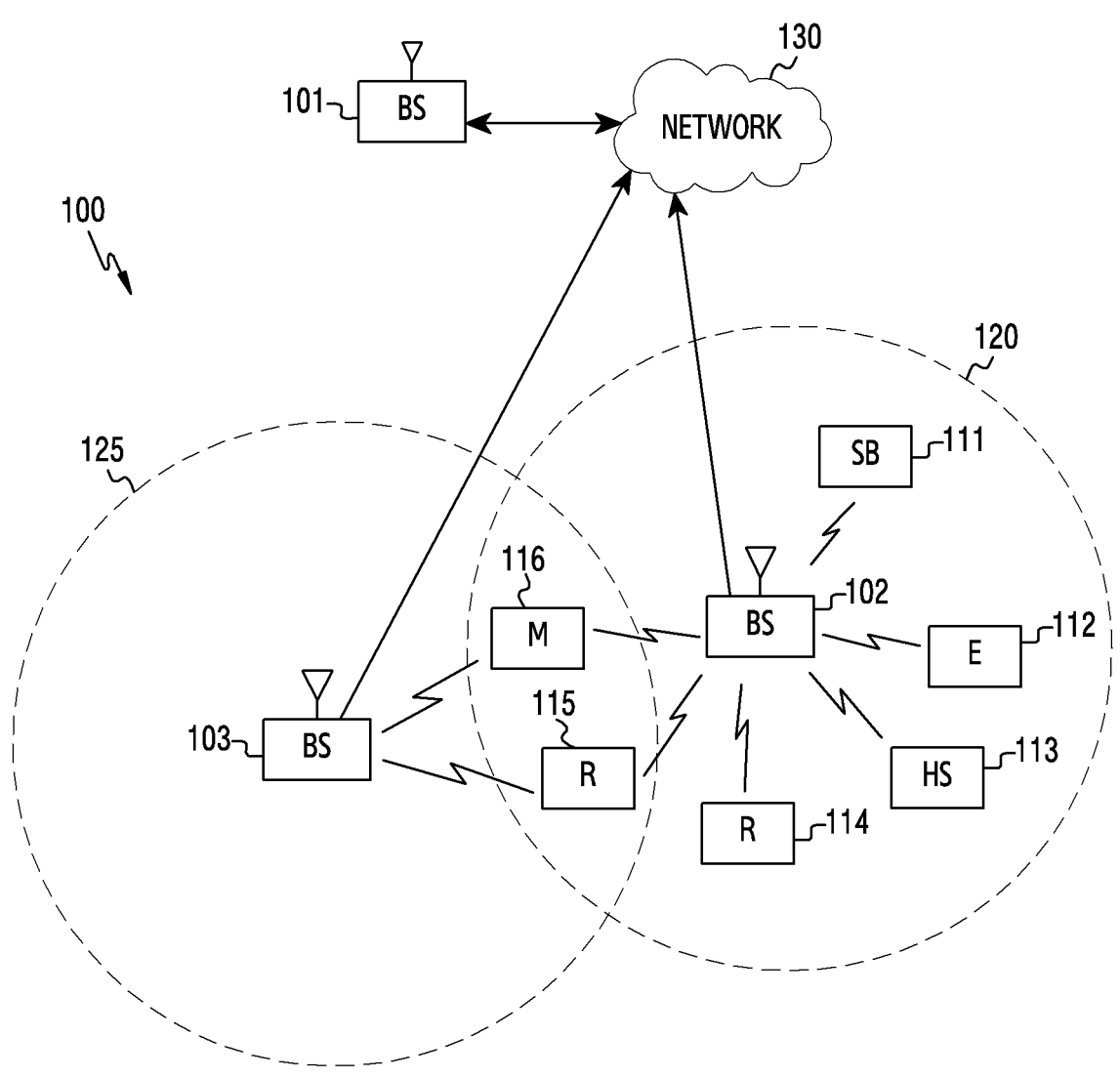
FIG. 1 illustrates an example of wireless network according to some embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of user equipments (UEs) within a coverage area 120 of gNB 102. The first plurality of UEs include a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. A gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of a gNB 101, a gNB 102, and a gNB 103 include a 2D antenna array as described in embodiments of the present disclosure. In some embodiments, one or more of a gNB 101, a gNB 102, and a gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, a gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
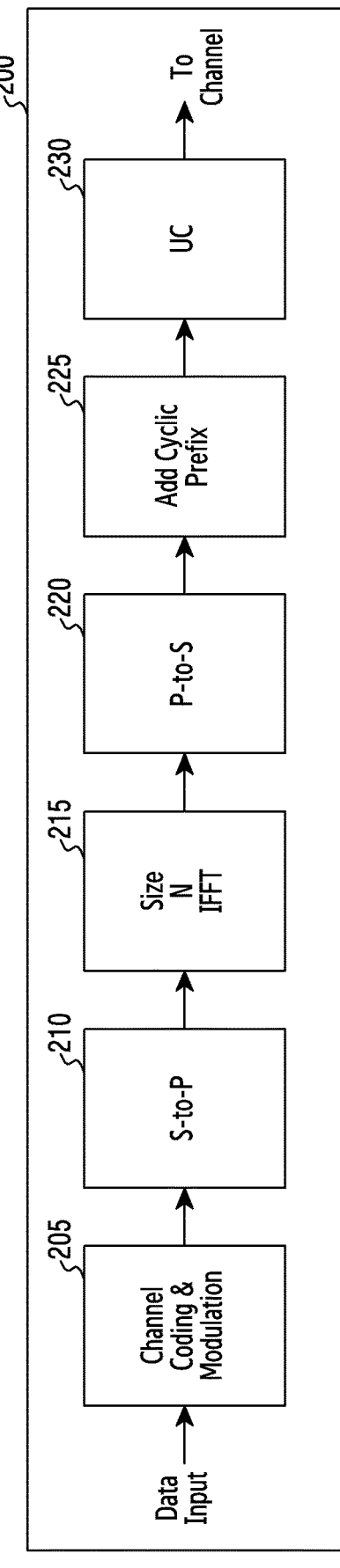
FIGS. 2A and 2B illustrate examples of wireless transmission and reception paths according to some embodiments of the present disclosure.
Figure 2B:
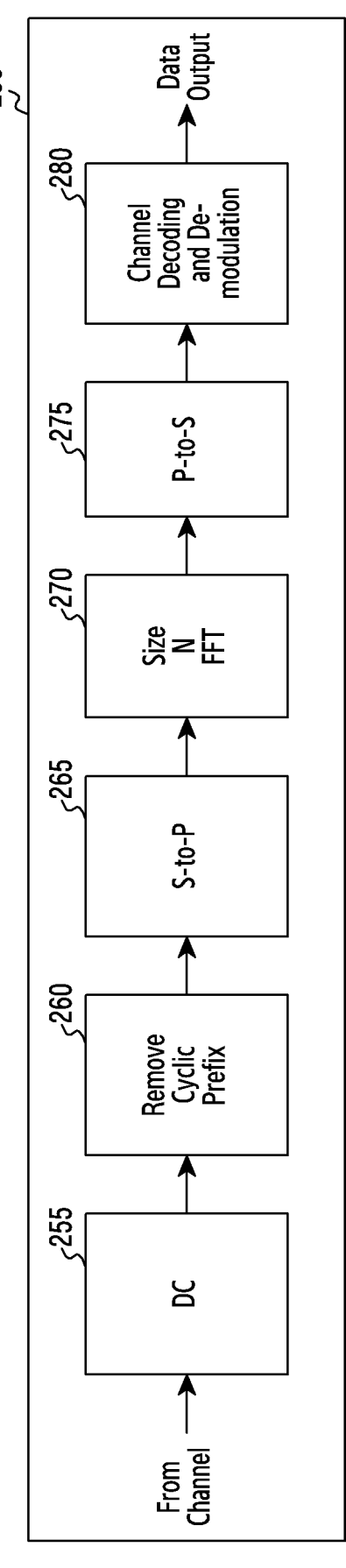

FIGS. 2A and 2B illustrate example wireless transmission and reception paths according to the present disclosure. In the following description, the transmission path 200 can be described as being implemented in a gNB, such as a gNB 102, and the reception path 250 can be described as being implemented in a UE, such as a UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in a gNB 102 and a UE 116. The size N IFFT block 215 performs IFFT operations on the N parallel symbol streams to generate a time-domain output signal. The parallel-to-serial block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from a gNB 102 arrives at a UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
FIG. 3A illustrates an example of UE according to some embodiments of the present disclosure.

FIG. 3A illustrates an example of UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
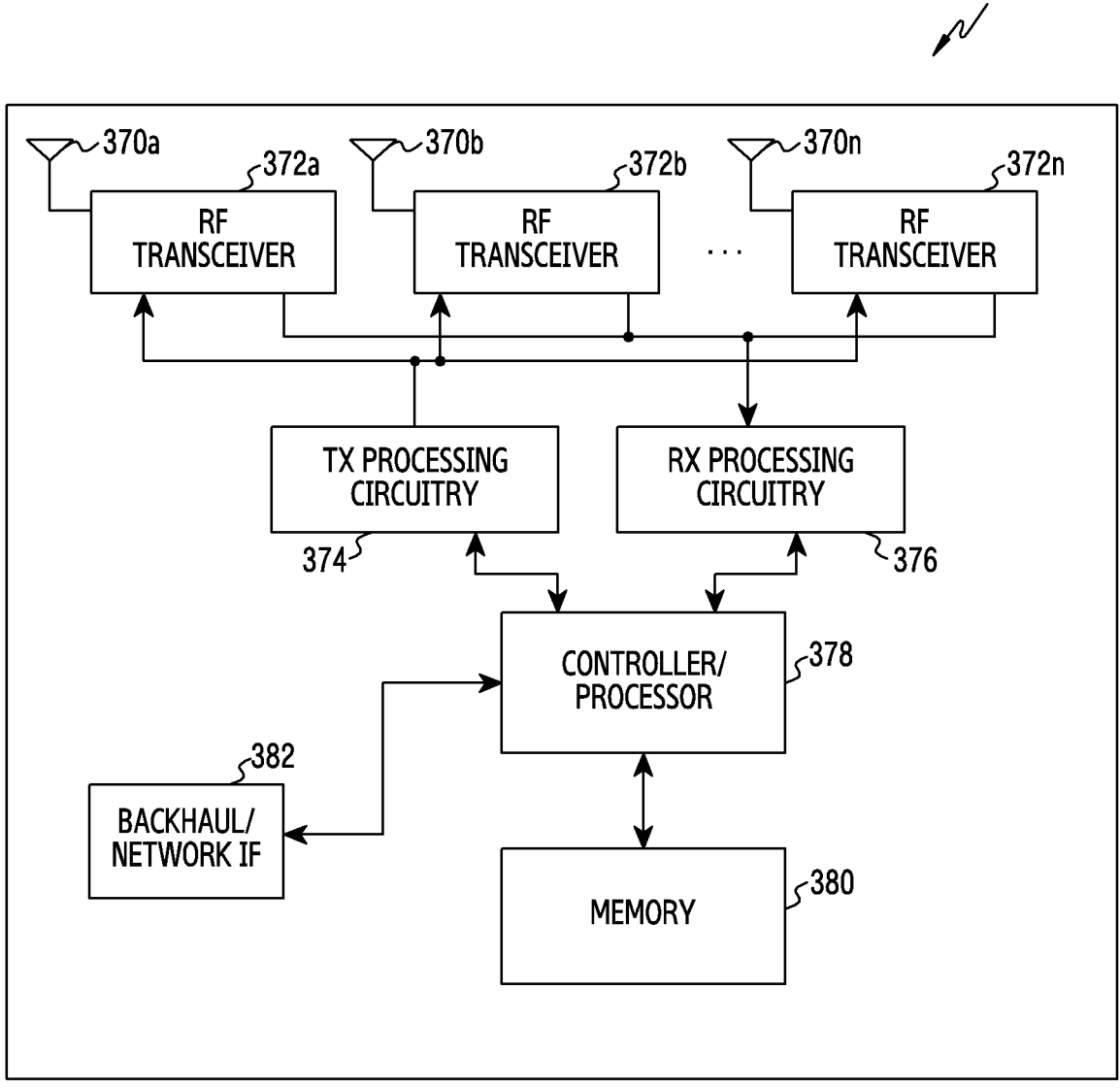
FIG. 3B illustrates an example of gNB according to some embodiments of the present disclosure.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372A-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372A-372n receive an incoming RF signal from antennas 370a-370n, such as a signal transmitted by UEs or other gNBs. RF transceivers 372A-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372A-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372A-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows a gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372A-372n, TX processing circuit 374 and/or RX processing circuit 376) support aggregated communication with FDD cells and TDD cells.

Although FIG. 3B illustrates an example of gNB 102, various changes may be made to FIG. 3B. For example, a gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

In order to enhance the coverage of the 5G wireless communication system or reduce the system latency, the method of duplex can be used: for example, a cross-division duplex (XDD) can be used in a TDD band (or unpaired spectrum). For another example, a subband non-overlapping full duplex can be used. The subband non-overlapping duplex means that a bandwidth (for example, carrier bandwidth) of a base station may be divided into more than one subband. Uplink and downlink ratios between the more than one subband may be different. This has the effect that the base station can flexibly change the uplink and downlink ratios of a part of the bandwidth, for example, the uplink and downlink ratios of a part of the bandwidth is allocated as full uplink (or full downlink), or larger uplink/downlink. Therefore, an uplink/a downlink transmission opportunity of a UE in time domain is increased, thereby enhancing the coverage of the UE or reducing the delay.

In order to make the purposes, technical schemes and advantages of the present application more clear, the implementations of the present application will be further described in detail below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

Figure 4:
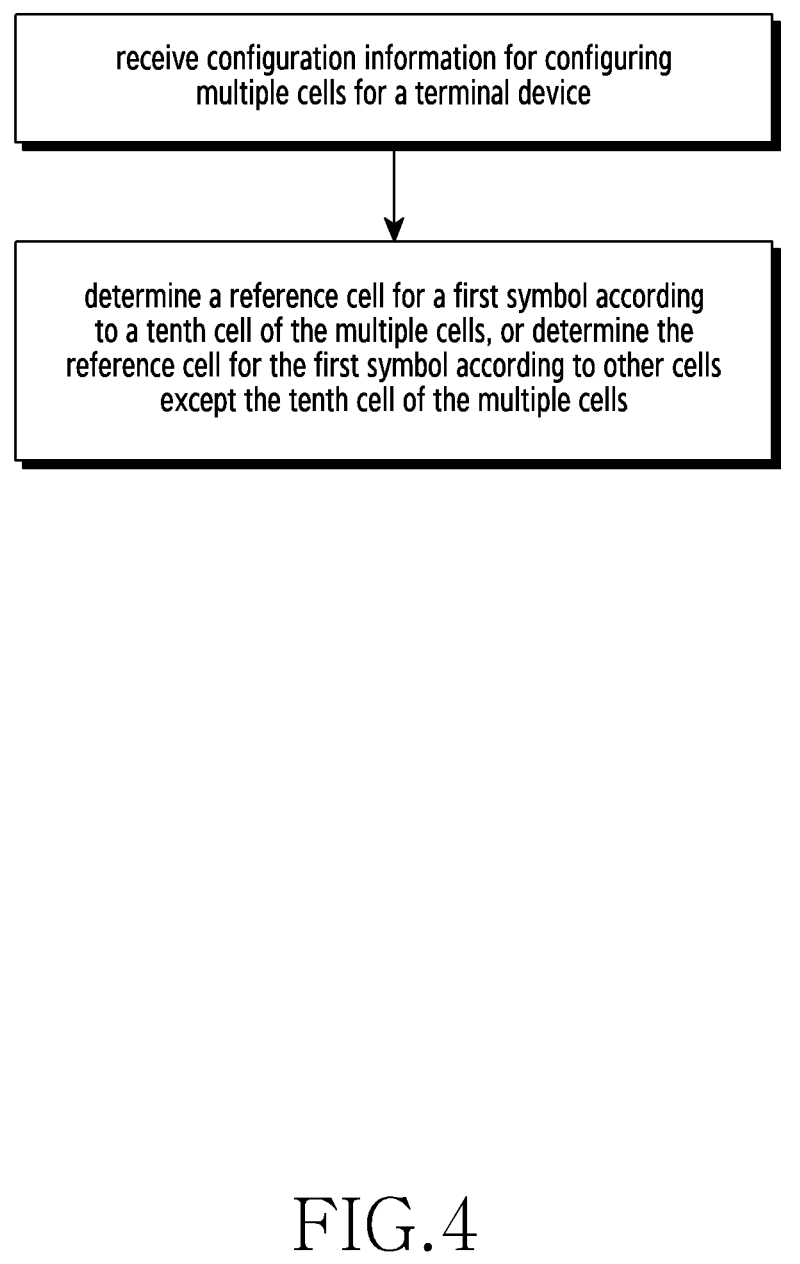

FIG. 4 illustrates a flowchart of a method for a collision handling according to various embodiments of the present disclosure.

The method may include a terminal device (or user equipment (UE)) being configured with multiple cells. For example, the terminal device being configured with the multiple cells may include the terminal device receiving configuration information for configuring the multiple cells for the terminal device. Optionally, the configuration information may be determined by a base station.

Additionally or alternatively, the method may include the terminal device determining a reference cell for a first symbol according to a tenth cell from the multiple cells, or determining the reference cell for the first symbol according to cell(s) other than the tenth cell from the multiple cells, wherein the first symbol is configured as uplink in the tenth cell and at least one frequency-domain resource in the tenth cell is for a downlink transmission; or the first symbol is configured as downlink in the tenth cell and at least one frequency-domain resource in the tenth cell is for an uplink transmission.

Optionally, a time-domain resource corresponding to the at least one frequency-domain resource includes the first symbol, or the time-domain resource corresponding to the at least one frequency-domain resource does not include the first symbol. Herein, "include" may mean "overlap." For example, in the embodiment, the time-domain resource including the first symbol may mean that the time-domain resource overlaps with the first symbol.

Additionally or alternatively, the method may include that the terminal device determines the reference cell according to a first set of cells among the multiple cells or among cells of the multiple cells that correspond to a same band; wherein the first set of cells (or a cell in the first set of cells) is associated with/corresponds to the first symbol; and in the first set of cells (or a cell in the first set of cells), the first symbol is configured as uplink or downlink.

The terminal device determining the reference cell according to the first set of cells among the multiple cells or among the cells of the multiple cells that correspond to the same band means that:

if the terminal device is not capable of simultaneous transmission and reception (for example, as indicated by terminal device capability signaling simultaneousRxTx-InterBandCA), the terminal device determines the reference cell according to the first set of cells among the multiple cells.

The terminal device determining the reference cell according to the first set of cells among the multiple cells or among the cells of the multiple cells that correspond to the same band means that:

if the terminal device is capable of simultaneous transmission and reception (for example, as indicated by the terminal device capability signaling simultaneousRxTxInterBandCA), the terminal device determines the reference cell according to the first set of cells among the cells of the multiple cells that correspond to the same band.

Optionally, a set of cells of the multiple cells is configured with a parameter enabling directional collision handling (for example, directionalCollisionHandling-r19="enabled").

Optionally, the terminal device reports (or indicates) a terminal device capability signaling, which indicates directional collision handling between reference and other cell(s) for a half-duplex operation in time-division duplex (TDD) carrier aggregation (CA) with a same subcarrier spacing (SCS) (for example, half-DuplexTDD-CA-SameSCS-19).

Optionally, the terminal device is not configured to monitor a physical downlink control channel (PDCCH) for detection of DCI format 2_0 in one (for example, any cell) of the multiple cells.

The method for determining the reference cell through the first set of cells is at least one of:

Method 1:

the terminal device determining the reference cell in the first set of cells means that the terminal device determines a cell with a smallest cell identifier (ID) in the first set of cells (among active cells) as the reference cell.

Method 2:

the terminal device determining the reference cell in the first set of cells means that the terminal device determines (at least one of) cells (for example, the tenth cells) configured with frequency-domain resources for uplink in the first set of cells (among active cells) as the reference cell. In addition, if there are multiple tenth cells, a tenth cell with a smallest cell ID is selected as the reference cell.

Method 3:

the terminal device determining the reference cell in the first set of cells means that the terminal device determines (at least one of) cells (for example, the tenth cells) configured with frequency-domain resources for downlink in the first set of cells (among active cells) as the reference cell. In addition, if there are multiple tenth cells, a tenth cell with a smallest cell ID is selected as the reference cell.

Method 4:

the terminal device determining the reference cell in the first set of cells means that the terminal device determines (at least one of) cell(s) other than the tenth cell(s) in the first set of cells (among active cells) as the reference cell. Optionally, if there are multiple cells other than the tenth cell(s), a tenth cell with a smallest cell ID is selected as the reference cell.

In an embodiment of the present disclosure, the determined reference cell may be one or more. For example, the first set of cells includes cells in different bands, and the terminal device determines the (corresponding) reference cells among cells in each band respectively.

Optionally, Method 2, Method 3, or Method 4 may be combined with Method 1. For example, when the cells (for example, the tenth cells) configured with the frequency-domain resources for uplink are applicable, Method 2 is used. When the cells (for example, the tenth cells) configured with the frequency-domain resources for uplink are not applicable, Method 1 is used. For another example, when the cells (for example, the tenth cells) configured with the frequency-domain resources for downlink are applicable, Method 2 is used. When the cells (for example, the tenth cells) configured with the frequency-domain resources for downlink are not applicable, Method 1 is used.

Optionally, (in at least one cell in the first set of cells or in the first set of cells) the first symbol being configured as downlink means at least one of the following (cases):

Case #1:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated).

Case #2:

(in at least one cell in the first set of cells or in the first set of cells) the first symbol is a flexible symbol and the terminal device is configured to receive at least one of a PDCCH, a physical downlink shared channel (PDSCH), and a channel state information-reference signal (CSI-RS) on the first symbol.

Case #3:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, but time-domain resources (or application time) related/corresponding to the frequency-domain resources do not include the first symbol. For example, the first set of cells includes cell #1. The terminal device is configured with uplink subbands in cell #1. According to semi-static TDD configuration information of cell #1, it is downlink on symbol #1. Time-domain resources (or application time) corresponding to the uplink subbands do not include symbol #1. Therefore, it can be understood that symbol #1 is configured as downlink in cell #1.

Case #4:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of a sounding reference signal (SRS), a physical uplink control channel (PUCCH), a physical uplink shared channel (PUSCH) and a physical random access channel (PRACH) on the symbol.

Case #5:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is not configured to transmit at least one of SRS, PUCCH, PUSCH and PRACH on the symbol.

Case #6:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.

Case #7:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.

Case #8:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is not configured to transmit at least one of SRS, PUCCH, PUSCH and PRACH on the symbol.

Case #9:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.

Case #10:

(in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources do not include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.

Case #11:
   (in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is configured to transmit (on the frequency-domain resources/subbands) at least one of SRS, PUCCH, PUSCH and PRACH on the symbol. Optionally, it is configured to receive (outside the frequency-domain resources/subbands) at least one of PDCCH, PDSCH and CSI-RS on the symbol.

Case #12:
   (in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is not configured to transmit (on the frequency-domain resources/subbands) at least one of SRS, PUCCH, PUSCH and PRACH on the symbol. Optionally, it is configured to receive (outside the frequency-domain resources/subbands) at least one of PDCCH, PDSCH and CSI-RS on the symbol.

Case #13:
   (in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is not configured to transmit (on the frequency-domain resources/subbands) at least one of SRS, PUCCH, PUSCH and PRACH on the symbol. Optionally, it is not configured to receive (outside the frequency-domain resources/subbands) at least one of the PDCCH, PDSCH and CSI-RS on the symbol.

Case #14:
   (in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources do not include the first symbol. Optionally, it is configured to receive (on the frequency-domain resources/subbands) at least one of the PDCCH, PDSCH, CSI-RS on the symbol. Optionally, it is configured to transmit (outside the frequency-domain resources/subbands) at least one of SRS, PUCCH, PUSCH and PRACH on the symbol.

Case #15:
   (in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is configured to transmit (outside the frequency-domain resources/subbands) at least one of SRS, PUCCH, PUSCH and PRACH on the symbol. Optionally, it is configured to receive (on the frequency-domain resources/subbands) at least one of the PDCCH, PDSCH, CSI-RS on the symbol.

Case #16:
   (in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is not configured to transmit (outside the frequency-domain resources/subbands) at least one of SRS, PUCCH, PUSCH and PRACH on the symbol. Optionally, it is configured to receive (on the frequency-domain resources/subbands) at least one of the PDCCH, PDSCH, CSI-RS on the symbol.

Optionally, (in at least one cell in the first set of cells or in the first set of cells) the first symbol being configured as uplink means at least one of the following (cases):

Case #1:
   (in at least one cell in the first set of cells or in the first set of cells) the first symbol is configured as uplink by semi-static TDD configuration information (tdd-UL-DL-ConfigurationCommon or tdd-UL-DL-ConfigurationDedicated).

Case #2:
   (in at least one cell in the first set of cells or in the first set of cells) the first symbol is a flexible symbol and the terminal device is configured to transmit at least one of SRS, PUCCH, PUSCH and PRACH on the first symbol.

Case #3:
   (in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources do not include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.

Case #4:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.

Case #5:

(in at least one cell in the first set of cells or in the first set of cells) the first symbol is configured as downlink by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is not configured to receive (outside the frequency-domain resources/subbands) at least one of the PDCCH, PDSCH and CSI-RS on the symbol. Optionally, it is configured to transmit (on the frequency-domain resources/subbands) at least one of SRS, PUCCH, PUSCH and PRACH on the symbol.

Case #6:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, but time-domain resources (or application time) related/corresponding to the frequency-domain resources do not include the first symbol. For example, the first set of cells includes cell #1. The terminal device is configured with downlink subbands in cell #1. According to semi-static TDD configuration information of cell #1, it is uplink on symbol #1. Time-domain resources (or application time) corresponding to the uplink subbands do not include symbol #1. Therefore, it can be understood that symbol #1 is configured as uplink in cell #1.

Case #7:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.

Case #8:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is not configured to receive at least one of PDCCH, PDSCH and CSI-RS on the symbol. Optionally, it is configured to transmit (on the frequency-domain resources/subbands) at least one of SRS, PUCCH, PUSCH and PRACH on the symbol.

Case #9:

(in at least one cell in the first set of cells or in the first set of cells) the first symbol is configured as uplink by semi-static TDD configuration information (tdd-UL-DL-ConfigurationCommon or tdd-UL-DL-ConfigurationDedicated); and the cell is configured with frequency-domain resources (e.g., subbands) for a downlink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.

Case #10:

(in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources do not include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.

Case #11:

(in at least one cell in the first set of cells or in the first set of cells) the first symbol is configured to be flexible by semi-static TDD configuration information (tdd-UL-DL-ConfigurationCommon or tdd-UL-DL-ConfigurationDedicated); and the cell is configured with frequency-domain resources (e.g., subbands) for an uplink transmission, and time-domain resources (or application time) corresponding to the frequency-domain resources include the first symbol. Optionally, it is configured to transmit (on the frequency-domain resources/subbands) at least one of SRS, PUCCH, PUSCH and PRACH on the symbol. Optionally, it is not configured to receive (outside the frequency-domain resources/subbands) at least one of the PDCCH, PDSCH and CSI-RS on the symbol.

Case #12:

(in at least one cell in the first set of cells or in the first set of cells) the first symbol is configured to be flexible by semi-static TDD configuration information (tdd-UL- DL-ConfigurationCommon or tdd-UL-DL-Configura-tionDedicated); and the cell is configured with fre-quency-domain resources (e.g., subbands) for an uplink transmission, and time-domain resources (or applica-tion time) corresponding to the frequency-domain resources include the first symbol. Optionally, it is configured to transmit (on the frequency-domain resources/subbands) at least one of SRS, PUCCH, PUSCH and PRACH on the symbol. Optionally, it is configured to receive (outside the frequency-domain resources/subbands) at least one of PDCCH, PDSCH and CSI-RS on the symbol.

Case #13:

(in at least one cell in the first set of cells or in the first set of cells) the first symbol is configured to be flexible by semi-static TDD configuration information (tdd-UL-DL-ConfigurationCommon or tdd-UL-DL-Configura-tionDedicated); and the cell is configured with fre-quency-domain resources (e.g., subbands) for an uplink transmission, and time-domain resources (or applica-tion time) corresponding to the frequency-domain resources include the first symbol. Optionally, it is not configured to transmit (on the frequency-domain resources/subbands) at least one of SRS, PUCCH, PUSCH and PRACH on the symbol. Optionally, it is not configured to receive (outside the frequency-do-main resources/subbands) at least one of the PDCCH, PDSCH and CSI-RS on the symbol.

Case #14:

(in at least one cell in the first set of cells or in the first set of cells) the first symbol is configured to be flexible by semi-static TDD configuration information (tdd-UL-DL-ConfigurationCommon or tdd-UL-DL-Configura-tionDedicated); and the cell is configured with fre-quency-domain resources (e.g., subbands) for a downlink transmission, and time-domain resources (or application time) corresponding to the frequency-do-main resources do not include the first symbol. Option-ally, it is configured to receive (on the frequency-domain resources/subbands) at least one of the PDCCH, PDSCH, CSI-RS on the symbol. Optionally, it is configured to transmit (outside the frequency-domain resources/subbands) at least one of SRS, PUCCH, PUSCH and PRACH on the symbol.

Case #15:

(in at least one cell in the first set of cells or in the first set of cells) the first symbol is configured to be flexible by semi-static TDD configuration information (tdd-UL-DL-ConfigurationCommon or tdd-UL-DL-Configura-tionDedicated); and the cell is configured with fre-quency-domain resources (e.g., subbands) for a downlink transmission, and time-domain resources (or application time) corresponding to the frequency-do-main resources include the first symbol. Optionally, it is configured to transmit (outside the frequency-domain resources/subbands) at least one of SRS, PUCCH, PUSCH and PRACH on the symbol. Optionally, it is configured to receive (on the frequency-domain resources/subbands) at least one of the PDCCH, PDSCH, CSI-RS on the symbol.

Case #16:

(in at least one cell in the first set of cells or in the first set of cells) the first symbol is configured to be flexible by semi-static TDD configuration information (tdd-UL-DL-ConfigurationCommon or tdd-UL-DL-Configura-tionDedicated); and the cell is configured with fre-quency-domain resources (e.g., subbands) for a downlink transmission, and time-domain resources (or application time) corresponding to the frequency-do-main resources include the first symbol. Optionally, it is configured to transmit (outside the frequency-domain resources/subbands) at least one of SRS, PUCCH, PUSCH and PRACH on the symbol. Optionally, it is not configured to receive (on the frequency-domain resources/subbands) at least one of PDCCH, PDSCH and CSI-RS on the symbol.

The above method provides a method for the terminal device to determine the reference cell, so that the terminal device can determine the reference cell in one or more cells with different uplink and downlink symbols. So that the base station can flexibly configure uplink symbols and downlink symbols in different cells, and the flexibility of the system is improved.

Figure 5:
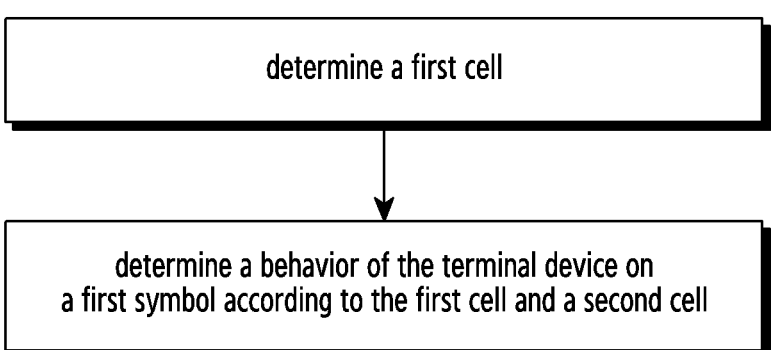
FIG. 5 illustrates another flowchart of a method for a collision handling according to various embodiments of the present disclosure.

FIG. 5 illustrates another flowchart of a method for a collision handling according to various embodiments of the present disclosure.

The method may include a terminal device determining a first cell.

Additionally or alternatively, the method may include the terminal device determining a behavior of the terminal device (on a first symbol) according to the first cell and a second cell.

Optionally, configuration parameters of the terminal device may refer to Embodiment 1.

Optionally, the first cell refers to a reference cell. The description of the reference cell may refer to Embodiment 1.

Optionally, on the first symbol, the method for determin-ing the reference cell (or the corresponding relationship between the first symbol and the reference cell) may refer to Embodiment 1.

Optionally, the second cell refers to at least one of the following cells:

one of cells configured with a parameter enabling direc-tional collision handling (for example, directionalCol-lisionHandling-r19="enabled");

a cell different from the first cell;

a cell with a same band as the first cell; or a cell with a different band from the first cell.

Optionally, the terminal device behavior is as follows:

Behavior #1-1:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is uplink in the first cell, the terminal device determines that the first symbol is a flexible symbol.

Behavior #1-2:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is uplink in the first cell, the terminal device is not required to receive higher layer configured PDCCH, PDSCH, or CSI-RS (on the first symbol).

Behavior #2-1:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell, the terminal device determines that the first symbol is a flexible symbol.

Behavior #2-2:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell, the terminal device is not expected to transmit higher layer configured SRS, PUCCH, PUSCH, or PRACH (on the first symbol).

Behavior #3:

when semi-static TDD configuration information (for example, tdd-UL-DL-ConfigurationCommon or tdd-UL-DL-ConfigurationDedicated) indicates that the first symbol is downlink in the first cell, the terminal device transmits a signal/channel scheduled by a DCI format (on the first symbol of the second cell).

Behavior #4:

when the terminal device detects a DCI format scheduling a transmission on one or more symbols of the second cell, the terminal device is not required to receive a higher layer configured PDCCH, PDSCH, or CSI-RS on (flexible symbols of) the one or more symbols of the first cell.

Behavior #5-1:

when the terminal device is configured by higher layers to transmit an uplink (UL) signal/channel (e.g., SRS, PUCCH, PUSCH, or PRACH) on the first symbol of the first cell, the terminal device determines that the first symbol indicated as downlink by semi-static TDD configuration information (for example, tdd-UL-DL-ConfigurationCommon or tdd-UL-DL-ConfigurationDedicated) in the second cell is a flexible symbol.

Behavior #5-2:

when the terminal device is configured by higher layers to transmit a downlink (DL) signal/channel (e.g., PDCCH, PDSCH, or CSI-RS) on the first symbol of the first cell, the terminal device determines that the first symbol indicated as uplink by semi-static TDD configuration information (for example, tdd-UL-DL-ConfigurationCommon or tdd-UL-DL-ConfigurationDedicated) in the second cell is a flexible symbol.

Behavior #6-1-1-1:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources do not include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #6-1-1-2:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #6-1-1-3:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive (outside the frequency-domain resources/subbands) at least one of the PDCCH, PDSCH and CSI-RS on the symbol. Optionally, it is configured to transmit (on the frequency-domain resources/subbands) at least one of SRS, PUCCH, PUSCH and PRACH on the symbol.), the terminal device determines that the first symbol is a flexible symbol.

Behavior #6-1-2-1:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), and the semi-static TDD configuration information (for example, tdd-UL-DL-ConfigurationCommon or tdd-UL-DL-ConfigurationDedicated) indicates that the first symbol is uplink in the first cell, the terminal device determines that the first symbol is a flexible symbol.

Behavior #6-1-2-2:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is not configured to transmit at least one of SRS, PUCCH, PUSCH and PRACH on the symbol.), and the semi-static TDD configuration information (for example, tdd-UL-DL-ConfigurationCommon or tdd-UL-DL-ConfigurationDedicated) indicates that the first symbol is uplink in the first cell, the terminal device determines that the first symbol is a flexible symbol.

Behavior #6-1-2-3:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., sub-bands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.), and the semi-static TDD configuration information (for example, tdd-UL-DL-ConfigurationCommon or tdd-UL-DL-ConfigurationDedicated) indicates that the first symbol is uplink in the first cell, the terminal device determines that the first symbol is a flexible symbol.

Behavior #6-2-1-1:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources do not include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device is not required to receive higher layer configured PDCCH, PDSCH, or CSI-RS (on the first symbol).

Behavior #6-2-1-2:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device is not required to receive higher layer configured PDCCH, PDSCH, or CSI-RS (on the first symbol).

Behavior #6-2-1-3:

when semi-static TDD configuration information (for example, tdd-UL-DL-ConfigurationCommon or tdd-UL-DL-ConfigurationDedicated) indicates that the first symbol is downlink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive (outside the frequency-domain resources/subbands) at least one of the PDCCH, PDSCH and CSI-RS on the symbol. Optionally, it is configured to transmit (on the frequency-domain resources/subbands) at least one of SRS, PUCCH, PUSCH and PRACH on the symbol.), the terminal device is not required to receive higher layer configured PDCCH, PDSCH, or CSI-RS (on the first symbol).

Behavior #6-2-2-1:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., sub-bands) for an uplink transmission, and time-domain resources (or application time) corresponding to the frequency-domain resources do not include the first symbol.), and the semi-static TDD configuration information (for example, tdd-UL-DL-ConfigurationCommon or tdd-UL-DL-ConfigurationDedicated) indicates that the first symbol is uplink in the first cell, the terminal device is not required to receive higher layer configured PDCCH, PDSCH, or CSI-RS (on the first symbol).

Behavior #6-2-2-2:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., sub-bands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), and the semi-static TDD configuration information (for example, tdd-UL-DL-ConfigurationCommon or tdd-UL-DL-ConfigurationDedicated) indicates that the first symbol is uplink in the first cell, the terminal device is not required to receive higher layer configured PDCCH, PDSCH, or CSI-RS (on the first symbol).

Behavior #6-2-2-3:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., sub-
bands) for an uplink transmission, and time-domain
resources (or application time) corresponding to the
frequency-domain resources include the first symbol.
Optionally, it is configured to receive (outside the
frequency-domain resources/subbands) at least one of
PDCCH, PDSCH and CSI-RS on the symbol. Option-
ally, it is not configured to transmit at least one of SRS,
PUCCH, PUSCH and PRACH on the symbol.), and the
semi-static TDD configuration information (for
example, tdd-UL-DL-ConfigurationCommon or tdd-
UL-DL-ConfigurationDedicated) indicates that the first
symbol is uplink in the first cell, the terminal device is
not required to receive higher layer configured
PDCCH, PDSCH, or CSI-RS (on the first symbol).
Behavior #6-2-2-4:
  when semi-static TDD configuration information (for
    example, tdd-UL-DL-ConfigurationCommon or tdd-
    UL-DL-ConfigurationDedicated) indicates that the first
    symbol is downlink in the second cell (and the cell is
    configured with frequency-domain resources (e.g., sub-
    bands) for an uplink transmission, and time-domain
    resources (or application time) corresponding to the
    frequency-domain resources include the first symbol.
    Optionally, it is configured to receive (outside the
    frequency-domain resources/subbands) at least one of
    PDCCH, PDSCH and CSI-RS on the symbol. Option-
    ally, it is configured to transmit (on the frequency-
    domain resources/subbands) at least one of SRS,
    PUCCH, PUSCH and PRACH on the symbol.), and the
    semi-static TDD configuration information (for
    example, tdd-UL-DL-ConfigurationCommon or tdd-
    UL-DL-ConfigurationDedicated) indicates that the first
    symbol is uplink in the first cell, the terminal device is
    not required to receive higher layer configured
    PDCCH, PDSCH, or CSI-RS (on the first symbol).
Behavior #7-1-1-1:
  when semi-static TDD configuration information (for
    example, tdd-UL-DL-ConfigurationCommon or tdd-
    UL-DL-ConfigurationDedicated) indicates that the first
    symbol is downlink in the second cell (and the cell is
    configured with frequency-domain resources (e.g., sub-
    bands) for an uplink transmission, and time-domain
    resources (or application time) corresponding to the
    frequency-domain resources do not include the first
    symbol. Optionally, it is not configured to receive at
    least one of PDCCH, PDSCH and CSI-RS on the
    symbol.), and the semi-static TDD configuration infor-
    mation (for example, tdd-UL-DL-ConfigurationCom-
    mon or tdd-UL-DL-ConfigurationDedicated) indicates
    that the first symbol is downlink in the first cell, the
    terminal device determines that the first symbol is a
    flexible symbol.
Behavior #7-1-1-2:
  when semi-static TDD configuration information (for
    example, tdd-UL-DL-ConfigurationCommon or tdd-
    UL-DL-ConfigurationDedicated) indicates that the first
    symbol is downlink in the second cell (and the cell is
    configured with frequency-domain resources (e.g., sub-
    bands) for an uplink transmission, and time-domain
    resources (or application time) corresponding to the
    frequency-domain resources include the first symbol.
    Optionally, it is not configured to receive at least one of
    PDCCH, PDSCH and CSI-RS on the symbol. Option-
    ally, it is not configured to transmit at least one of SRS,
    PUCCH, PUSCH and PRACH on the symbol.), and the
    semi-static TDD configuration information (for example, tdd-UL-DL-ConfigurationCommon or tdd-
UL-DL-ConfigurationDedicated) indicates that the first
symbol is downlink in the first cell, the terminal device
determines that the first symbol is a flexible symbol.
Behavior #7-1-1-3:
  when semi-static TDD configuration information (for
    example, tdd-UL-DL-ConfigurationCommon or tdd-
    UL-DL-ConfigurationDedicated) indicates that the first
    symbol is downlink in the second cell (and the cell is
    configured with frequency-domain resources (e.g., sub-
    bands) for an uplink transmission, and time-domain
    resources (or application time) corresponding to the
    frequency-domain resources include the first symbol.
    Optionally, it is not configured to receive (outside the
    frequency-domain resources/subbands) at least one of
    the PDCCH, PDSCH and CSI-RS on the symbol.
    Optionally, it is configured to transmit (on the fre-
    quency-domain resources/subbands) at least one of
    SRS, PUCCH, PUSCH and PRACH on the symbol.),
    and the semi-static TDD configuration information (for
    example, tdd-UL-DL-ConfigurationCommon or tdd-
    UL-DL-ConfigurationDedicated) indicates that the first
    symbol is downlink in the first cell, the terminal device
    determines that the first symbol is a flexible symbol.
Behavior #7-1-2-1:
  when semi-static TDD configuration information (for
    example, tdd-UL-DL-ConfigurationCommon or tdd-
    UL-DL-ConfigurationDedicated) indicates that the first
    symbol is uplink in the second cell, and the semi-static
    TDD configuration information (for example, tdd-UL-
    DL-ConfigurationCommon or tdd-UL-DL-Configura-
    tionDedicated) indicates that the first symbol is down-
    link in the first cell (and the cell is configured with
    frequency-domain resources (e.g., subbands) for an
    uplink transmission, but time-domain resources (or
    application time) related/corresponding to the fre-
    quency-domain resources do not include the first sym-
    bol.), the terminal device determines that the first
    symbol is a flexible symbol.
Behavior #7-1-2-2:
  when semi-static TDD configuration information (for
    example, tdd-UL-DL-ConfigurationCommon or tdd-
    UL-DL-ConfigurationDedicated) indicates that the first
    symbol is uplink in the second cell, and the semi-static
    TDD configuration information (for example, tdd-UL-
    DL-ConfigurationCommon or tdd-UL-DL-Configura-
    tionDedicated) indicates that the first symbol is down-
    link in the first cell (and the cell is configured with
    frequency-domain resources (e.g., subbands) for an
    uplink transmission, and time-domain resources (or
    application time) corresponding to the frequency-do-
    main resources include the first symbol. Optionally, it
    is not configured to receive at least one of PDCCH,
    PDSCH and CSI-RS on the symbol. Optionally, it is not
    configured to transmit at least one of SRS, PUCCH,
    PUSCH and PRACH on the symbol.), the terminal
    device determines that the first symbol is a flexible
    symbol.
Behavior #7-1-2-3:
  when semi-static TDD configuration information (for
    example, tdd-UL-DL-ConfigurationCommon or tdd-
    UL-DL-ConfigurationDedicated) indicates that the first
    symbol is uplink in the second cell, and the semi-static
    TDD configuration information (for example, tdd-UL-
    DL-ConfigurationCommon or tdd-UL-DL-Configura-
    tionDedicated) indicates that the first symbol is down-
    link in the first cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #7-1-2-4:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.), the terminal device determines that the first symbol is a flexible symbol.

Behavior #7-2-1-1:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., subbands) for an uplink transmission, and time-domain resources (or application time) corresponding to the frequency-domain resources do not include the first symbol. Optionally, it is not configured to receive at least one of PDCCH, PDSCH and CSI-RS on the symbol.), and the semi-static TDD configuration information (for example, tdd-UL-DL-ConfigurationCommon or tdd-UL-DL-ConfigurationDedicated) indicates that the first symbol is downlink in the first cell, the terminal device is not expected to transmit higher layer configured SRS, PUCCH, PUSCH, or PRACH.

Behavior #7-2-1-2:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), and the semi-static TDD configuration information (for example, tdd-UL-DL-ConfigurationCommon or tdd-UL-DL-ConfigurationDedicated) indicates that the first symbol is downlink in the first cell, the terminal device is not expected to transmit higher layer configured SRS, PUCCH, PUSCH, or PRACH.

Behavior #7-2-1-3:

when semi-static TDD configuration information (for example, tdd-UL-DL-ConfigurationCommon or tdd-UL-DL-ConfigurationDedicated) indicates that the first symbol is downlink in the second cell (and the cell is configured with frequency-domain resources (e.g., subbands) for an uplink transmission, and time-domain resources (or application time) corresponding to the frequency-domain resources include the first symbol. Optionally, it is not configured to receive (outside the frequency-domain resources/subbands) at least one of the PDCCH, PDSCH and CSI-RS on the symbol. Optionally, it is configured to transmit (on the frequency-domain resources/subbands) at least one of SRS, PUCCH, PUSCH and PRACH on the symbol.), and the semi-static TDD configuration information (for example, tdd-UL-DL-ConfigurationCommon or tdd-UL-DL-ConfigurationDedicated) indicates that the first symbol is downlink in the first cell, the terminal device is not expected to transmit higher layer configured SRS, PUCCH, PUSCH, or PRACH.

Behavior #7-2-2-1:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, but time-domain resources (or application time) related/corresponding to the frequency-domain resources do not include the first symbol.), the terminal device is not expected to transmit higher layer configured SRS, PUCCH, PUSCH, or PRACH.

Behavior #7-2-2-2:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device is not expected to transmit higher layer configured SRS, PUCCH, PUSCH, or PRACH.

Behavior #7-2-2-3:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device is not expected to transmit higher layer configured SRS, PUCCH, PUSCH, or PRACH.

Behavior #7-2-2-4:

when semi-static TDD configuration information (for example, tdd-UL-DL-ConfigurationCommon or tdd-UL-DL-ConfigurationDedicated) indicates that the first symbol is uplink in the second cell, and the semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.), the terminal device is not expected to transmit higher layer configured SRS, PUCCH, PUSCH, or PRACH.

Behavior #8-1:

when semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, but time-domain resources (or application time) related/corresponding to the frequency-domain resources do not include the first symbol), the terminal device transmits a signal/channel scheduled by a DCI format (on the first symbol of the second cell).

Behavior #8-2:

when semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol), the terminal device transmits a signal/channel scheduled by a DCI format (on the first symbol of the second cell).

Behavior #8-3:

when semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is not configured to transmit at least one of SRS, PUCCH, PUSCH and PRACH on the symbol), the terminal device transmits a signal/channel scheduled by a DCI format (on the first symbol of the second cell).

Behavior #8-4:

when semi-static TDD configuration information (for example, tdd-UL-DL-ConfigurationCommon or tdd-UL-DL-ConfigurationDedicated) indicates that the first symbol is downlink in the first cell (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol), the terminal device transmits a signal/channel scheduled by a DCI format (on the first symbol of the second cell).

Behavior #9-1-1:

when the terminal device is configured by higher layers to transmit a UL signal/channel (e.g., SRS, PUCCH, PUSCH, or PRACH) on the first symbol of the first cell, and semi-static TDD configuration information (for example, tdd-UL-DL-ConfigurationCommon or tdd-UL-DL-ConfigurationDedicated) indicates that the first symbol is downlink (and the cell is configured with frequency-domain resources (e.g., subbands) for an uplink transmission, but time-domain resources (or application time) related/corresponding to the frequency-domain resources do not include the first symbol.), the terminal device determines that the first symbol is a flexible symbol.

Behavior #9-1-2:

when the terminal device is configured by higher layers to transmit a UL signal/channel (e.g., SRS, PUCCH, PUSCH, or PRACH) on the first symbol of the first cell, and semi-static TDD configuration information (for example, tdd-UL-DL-ConfigurationCommon or tdd-UL-DL-ConfigurationDedicated) indicates that the first symbol is downlink (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #9-1-3:

when the terminal device is configured by higher layers to transmit a UL signal/channel (e.g., SRS, PUCCH, PUSCH, or PRACH) on the first symbol of the first cell, and semi-static TDD configuration information (for example, tdd-UL-DL-ConfigurationCommon or tdd-UL-DL-ConfigurationDedicated) indicates that the first symbol is downlink (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #9-1-4:

when the terminal device is configured by higher layers to transmit a UL signal/channel (e.g., SRS, PUCCH, PUSCH, or PRACH) on the first symbol of the first cell, and semi-static TDD configuration information (for example, tdd-UL-DL-ConfigurationCommon or tdd-UL-DL-ConfigurationDedicated) indicates that the first symbol is downlink (and the cell is configured with frequency-domain resources (e.g., subbands) for an uplink transmission, and time-domain resources (or application time) corresponding to the frequency-domain resources include the first symbol. Optionally, it is configured to receive (outside the frequency-domain resources/subbands) at least one of PDCCH, PDSCH and CSI-RS on the symbol. Optionally, it is configured to transmit (on the frequency-domain resources/subbands) at least one of SRS, PUCCH, PUSCH and PRACH on the symbol.), the terminal device determines that the first symbol is a flexible symbol.

Behavior #9-2-1:

when the terminal device is configured by higher layers to transmit a DL signal/channel (e.g., PDCCH, PDSCH, or CSI-RS) on the first symbol of the first cell, and semi-static TDD configuration information (for example, tdd-UL-DL-ConfigurationCommon or tdd-UL-DL-ConfigurationDedicated) indicates that the first symbol is uplink (and the cell is configured with frequency-domain resources (e.g., subbands) for an uplink transmission, and time-domain resources (or application time) corresponding to the frequency-domain resources do not include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #9-2-2:

when the terminal device is configured by higher layers to transmit a DL signal/channel (e.g., PDCCH, PDSCH, or CSI-RS) on the first symbol of the first cell, and semi-static TDD configuration information (for example, tdd-UL-DL-ConfigurationCommon or tdd-UL-DL-ConfigurationDedicated) indicates that the first symbol is uplink (and the cell is configured with frequency-domain resources (e.g., subbands) for an uplink transmission, and time-domain resources (or application time) corresponding to the frequency-domain resources include the first symbol. Optionally, it is not configured to receive at least one of PDCCH, PDSCH and CSI-RS on the symbol. Optionally, it is not configured to transmit at least one of SRS, PUCCH, PUSCH and PRACH on the symbol.), the terminal device determines that the first symbol is a flexible symbol.

Behavior #9-2-3:

when the terminal device is configured by higher layers to transmit a DL signal/channel (e.g., PDCCH, PDSCH, or CSI-RS) on the first symbol of the first cell, and semi-static TDD configuration information (for example, tdd-UL-DL-ConfigurationCommon or tdd- UL-DL-ConfigurationDedicated) indicates that the first symbol is uplink (and the cell is configured with frequency-domain resources (e.g., subbands) for an uplink transmission, and time-domain resources (or application time) corresponding to the frequency-domain resources include the first symbol. Optionally, it is not configured to receive (outside the frequency-domain resources/subbands) at least one of the PDCCH, PDSCH and CSI-RS on the symbol. Optionally, it is configured to transmit (on the frequency-domain resources/subbands) at least one of SRS, PUCCH, PUSCH and PRACH on the symbol.), the terminal device determines that the first symbol is a flexible symbol.

The above method provides a solution to the directional collision of the terminal device, so that the terminal device can determine the corresponding uplink and downlink directions in one or more cells configured with different uplink and downlink symbols, and the flexibility and reliability of the system are improved.

Figure 6:
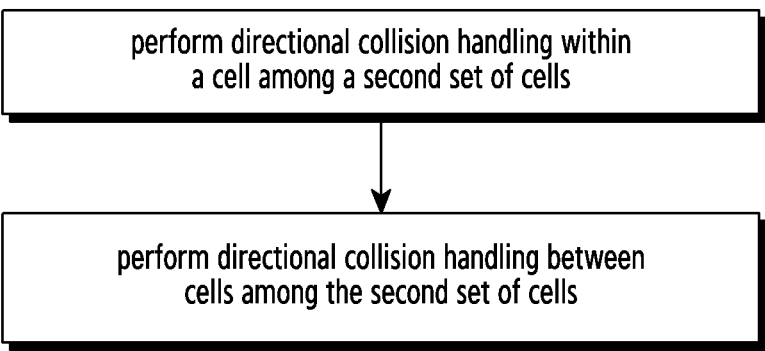
FIG. 6 illustrates another flowchart of a method for a collision handling according to various embodiments of the present disclosure.

FIG. 6 illustrates another flowchart of a method for a collision handling according to various embodiments of the present disclosure.

The method may include a terminal device (UE) first applying the procedures/operations for directional collision handling within each of cell (or specific cell) among a set of cells, if applicable, wherein the specific cell includes a cell with directional collision among the set of cells, and whether a cell has directional collision can be determined according to various (pre-configured) information or parameters. For example, the terminal device performs directional collision handling within a cell among a second set of cells.

Additionally or alternatively, the method may include the terminal device (UE) then applying the procedures/operations for directional collision handling within the set of cells. For example, the terminal device performs directional collision handling between cells among the second set of cells.

Optionally, a cell applicable to directional collision handling within a cell refers to a cell configured with frequency-domain resources (or subbands) for an uplink transmission.

The above method can be understood as follows: the terminal device firstly handles the directional collision within the cell and handle the directional collision handling between the cells according to the result of the direction handling within the cell. For example, a terminal device is configured with four cells (for example, cell #1, cell #2, cell #3, cell #4). Cell #1 and cell #2 are configured with frequency-domain resources (or subbands) for an uplink transmission. Time-domain resources related/corresponding to the frequency-domain resources for an uplink transmission include symbols configured as downlink by semi-static TDD configuration information. On such symbols, since there are both downlink symbol indications and an uplink transmission indications, the terminal device is required to handle/resolve uplink and downlink collisions within the cell (for example, cell #1 and cell #2). Through the directional collision process/directional collision handling method, each cell may obtain a collision handling result of a symbol (for example, as uplink symbol, downlink symbol, flexible symbol). According to the result of the directional collision handling with the cell, the terminal device (further) handles directional collisions of cell #1, cell #2, cell #3 and cell #4.

Optionally, the set of cells refers to at least one of:

a set of cells configured with a parameter enabling directional collision handling (for example, directionalCollisionHandling-r19="enabled");

a set of cells configured for the terminal device;

a set of cells with the same band; or a set of cells in the same band as the reference cell.

The above method may further include at least one of following examples:

In one example, the terminal device (UE) first applying the procedures/operations for directional collision handling within each of cell among a set of cells, if applicable. For example, the terminal device performs directional collision handling within a cell among a second set of cells.

In one example, the terminal device (UE) then applies the procedures/operations for directional collision handling within the cells in the same band among the set of cells. For example, the terminal device performs directional collision handling between cells in the same band among the second set of cells.

In one example, the terminal device (UE) then applies the procedures/operations for directional collision handling within the cells across different bands among the set of cells. For example, the terminal device performs directional collision handling between cells across different bands among the second set of cells.

The above method can be understood as follows: the terminal device firstly handles the directional collision within the cell and handle the directional collision handling between the cells according to a result of the direction handling within the cell. For example, a terminal device is configured with four cells (for example, cell #1, cell #2, cell #3, cell #4). Cell #1 and cell #2 are configured with frequency-domain resources (or subbands) for an uplink transmission. Time-domain resources related/corresponding to the frequency-domain resources for an uplink transmission include symbols configured as downlink by semi-static TDD configuration information. On such symbols, since there are both downlink symbol indications and an uplink transmission indications, the terminal device is required to handle/resolve uplink and downlink collisions within the cell (for example, cell #1 and cell #2).

Through the directional collision process/directional collision handling method, each cell may obtain a collision handling result of a symbol (for example, as uplink symbol, downlink symbol, flexible symbol). According to the result of the directional collision handling with the cell, the terminal device (further) handles directional collisions of cell #1, cell #2, cell #3 and cell #4. In addition, cell #1 and cell #2 belong to band #1; and cell #3 and cell #4 belong to band #2. That is, the terminal device respectively handles directional collisions (on a symbol) of cell #1 and cell #2; directional collisions (on a symbol) of cell #3 and cell #4. Then, according to handling results of cell #1 and cell #2 and handling results of cell #3 and cell #4, a directional collision (on a symbol) is further handled.

The above method provides a solution to the directional collision of the terminal device, so that the terminal device can determine the corresponding uplink and downlink directions in one or more cells with different uplink and downlink symbols, and the flexibility and reliability of the system are improved.

Figure 7:
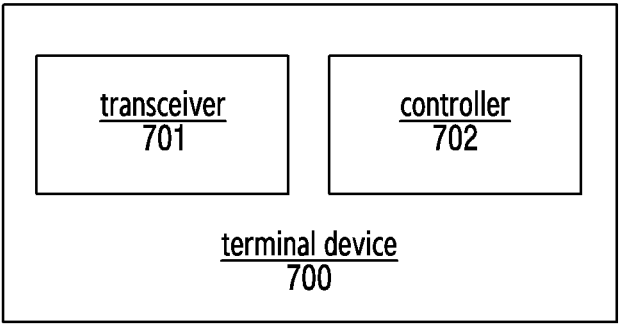
FIG. 7 illustrates an example of configuration of a terminal device according to various embodiments of the present disclosure.

FIG. 7 illustrates an example of configuration of a terminal device 700 according to various embodiments of the present disclosure.

Referring to FIG. 7, the terminal device 700 according to various embodiments of the present disclosure may include a transceiver 701 and a controller 702. For example, the transceiver 701 may be configured to transmit and receive signals. For example, the controller 702 may be coupled to the transceiver 701 and configured to perform the aforementioned methods.

Figure 8:
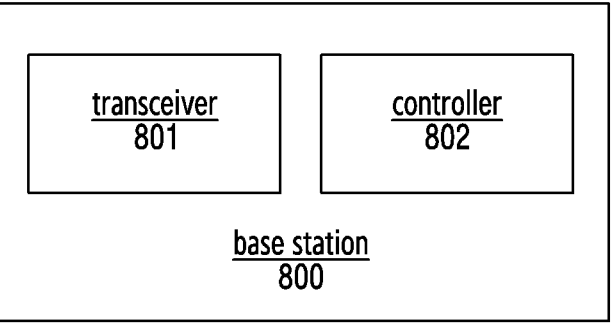
FIG. 8 illustrates an example of configuration of a base station according to various embodiments of the present disclosure.

FIG. 8 illustrates an example of configuration of a base station 800 according to various embodiments of the present disclosure.

Referring to FIG. 8, the base station 800 according to various embodiments of the present disclosure may include a transceiver 801 and a controller 802. For example, the transceiver 801 may be configured to transmit and receive signals. For example, the controller 802 may be coupled to the transceiver 801 and configured to perform the aforementioned methods.

Although the terminal device and the base station are illustrated as having separate functional blocks for convenience of explanation, the configurations of the terminal device and the base station are not limited thereto. For example, the terminal device and the base station may include a communication unit including a transceiver and a controller. The terminal device and the base station may communicate with at least one network node by means of the communication unit.

Some embodiments of the present disclosure provide a method performed by a terminal device, including: receiving configuration information for configuring multiple cells for the terminal device; and determining a reference cell for a first symbol according to a tenth cell from the multiple cells, or determining the reference cell for the first symbol according to a cell other than the tenth cell from the multiple cells, wherein the first symbol is configured as uplink in the tenth cell and at least one frequency-domain resource in the tenth cell is for a downlink transmission; or the first symbol is configured as downlink in the tenth cell and at least one frequency-domain resource in the tenth cell is for an uplink transmission.

In some examples, a time-domain resource corresponding to the at least one frequency-domain resource includes the first symbol, or the time-domain resource corresponding to the at least one frequency-domain resource does not include the first symbol.

In some examples, the determining of the reference cell for the first symbol includes at least one of: determining a cell with a smallest cell identifier (ID) in the first set of cells as the reference cell, determining the reference cell based on the tenth cell included in the first set of cells, determining at least one cell in the first set of cells as the reference cell, wherein the first symbol is configured as uplink or downlink in a cell in the first set of cells.

In some examples, the first symbol being configured as downlink in the cell in the first set of cells includes at least one of examples.

In one example, the first symbol being configured as downlink by semi-static TDD configuration information on the cell in the first set of cells.

In another example, the first symbol being a flexible symbol on the cell in the first set of cells, and the terminal device being configured to receive at least one of a physical downlink control channel (PDCCH), a physical downlink shared channel (PDSCH), and a channel state information (CSI) reference signal (RS) on the first symbol on the cell in the first set of cells.

In yet another example, the first symbol being configured as downlink by the semi-static TDD configuration information on the cell in the first set of cells, and the cell in the first set of cells being configured with frequency-domain resources for an uplink transmission, but time-domain resources corresponding to the frequency-domain resources not including the first symbol.

In yet another example, the first symbol being configured as downlink by the semi-static TDD configuration information on the cell in the first set of cells, and the cell in the first set of cells being configured with the frequency-domain resources for an uplink transmission, and the time-domain resources corresponding to the frequency-domain resources including the first symbol.

In yet another example, the first symbol being configured as uplink by the semi-static TDD configuration information on the cell in the first set of cells, and the cell in the first set of cells being configured with frequency-domain resources for a downlink transmission, and time-domain resources corresponding to the frequency-domain resources including the first symbol.

In yet another example, the first symbol being configured to be flexible by the semi-static TDD configuration information on the cell in the first set of cells, and the cell in the first set of cells being configured with the frequency-domain resources for an uplink transmission, and the time-domain resources corresponding to the frequency-domain resources not including the first symbol.

In yet another example, the first symbol being configured to be flexible by the semi-static TDD configuration information on the cell in the first set of cells, and the cell in the first set of cells being configured with the frequency-domain resources for an uplink transmission, and the time-domain resources corresponding to the frequency-domain resources including the first symbol.

In yet another example, the first symbol being configured to be flexible by the semi-static TDD configuration information on the cell in the first set of cells, and the cell in the first set of cells being configured with the frequency-domain resources for a downlink transmission, and the time-domain resources corresponding to the frequency-domain resources not including the first symbol.

In yet another example, the first symbol being configured to be flexible by the semi-static TDD configuration information on the cell in the first set of cells, and the cell in the first set of cells being configured with the frequency-domain resources for a downlink transmission, and the time-domain resources corresponding to the frequency-domain resources including the first symbol.

In some examples, the first symbol being configured as uplink in the cell in the first set of cells includes at least one of examples.

In one example, the first symbol being configured as uplink by semi-static TDD configuration information on the cell in the first set of cells.

In another example, the first symbol being a flexible symbol on the cell in the first set of cells, and the terminal device being configured to transmit at least one of a sounding reference signal (SRS), a physical uplink control channel (PUCCH), a physical uplink shared channel (PUSCH), and a physical random access channel (PRACH) on the first symbol on the cell in the first set of cells.

In yet another example, the first symbol being configured as downlink by the semi-static TDD configuration information on the cell in the first set of cells, and the cell in the first set of cells being configured with frequency-domain resources for an uplink transmission, and time-domain resources corresponding to the frequency-domain resources not including the first symbol.

In yet another example, the first symbol being configured as downlink by the semi-static TDD configuration information on the cell in the first set of cells, and the cell in the first set of cells being configured with the frequency-domain resources for an uplink transmission, and the time-domain resources corresponding to the frequency-domain resources including the first symbol.

In yet another example, the first symbol being configured as uplink by the semi-static TDD configuration information on the cell in the first set of cells, and the cell in the first set of cells being configured with frequency-domain resources for a downlink transmission, but time-domain resources corresponding to the frequency-domain resources not including the first symbol.

In yet another example, the first symbol being configured as uplink by the semi-static TDD configuration information on the cell in the first set of cells, and the cell in the first set of cells being configured with the frequency-domain resources for a downlink transmission, and the time-domain resources corresponding to the frequency-domain resources including the first symbol.

In yet another example, the first symbol being configured to be flexible by the semi-static TDD configuration information on the cell in the first set of cells, and the cell in the first set of cells being configured with the frequency-domain resources for an uplink transmission, and the time-domain resources corresponding to the frequency-domain resources not including the first symbol.

In yet another example, the first symbol being configured to be flexible by the semi-static TDD configuration information on the cell in the first set of cells, and the cell in the first set of cells being configured with the frequency-domain resources for an uplink transmission, and the time-domain resources corresponding to the frequency-domain resources including the first symbol.

In yet another example, the first symbol being configured to be flexible by the semi-static TDD configuration information on the cell in the first set of cells, and the cell in the first set of cells being configured with the frequency-domain resources for a downlink transmission, and the time-domain resources corresponding to the frequency-domain resources not including the first symbol.

In yet another example, the first symbol being configured to be flexible by the semi-static TDD configuration information on the cell in the first set of cells, and the cell in the first set of cells being configured with the frequency-domain resources for a downlink transmission, and the time-domain resources corresponding to the frequency-domain resources including the first symbol.

Some embodiments of the present disclosure provide a method performed by a base station, including: determining configuration information for configuring multiple cells for a terminal device; and transmitting the configuration information to the terminal device, wherein a tenth cell from the multiple cells is used to determine a reference cell for a first symbol, or a cell other than the tenth cell from the multiple cells are used to determine the reference cell for the first symbol, and wherein the first symbol is configured as uplink in the tenth cell and at least one frequency-domain resource in the tenth cell is for a downlink transmission, or the first symbol is configured as downlink in the tenth cell and at least one frequency-domain resource in the tenth cell is for an uplink transmission.

In some examples, a time-domain resource corresponding to the at least one frequency-domain resource includes the first symbol, or the time-domain resource corresponding to the at least one frequency-domain resource does not include the first symbol.

Some embodiments of the present disclosure provide a method performed by a terminal device, including: determine a first cell; and determining a behavior of the terminal device on a first symbol according to the first cell and a second cell; wherein the first symbol is configured as uplink in the first cell and at least one frequency-domain resource in the first cell is for a downlink transmission; or the first symbol is configured as downlink in the first cell and at least one frequency-domain resource in the first cell is for an uplink transmission; and/or the first symbol is configured as uplink in the second cell and at least one frequency-domain resource in the second cell is for a downlink transmission; or the first symbol is configured as downlink in the second cell and at least one frequency-domain resource in the second cell is for an uplink transmission.

In some examples, the first cell is a reference cell, and the reference cell is determined according to the aforementioned methods.

In some examples, the second cell includes at least one of: one of cells configured with a parameter indicating enabling of directional collision handling, a cell different from the first cell, a cell with a same band as the first cell, and a cell with a different band from the first cell.

In some examples, the behavior of the terminal device includes at least one of following examples.

In one example, when the first symbol satisfies a first specific condition, the terminal device determining that the first symbol is a flexible symbol.

In another example, when the first symbol satisfies a second specific condition, the terminal device being not required to receive a higher layer configured physical downlink control channel (PDCCH), physical downlink shared channel (PDSCH), or channel state information (CSI) reference signal (RS) on the first symbol.

In yet another example, when the first symbol satisfies a third specific condition, the terminal device being not expected to transmit a higher layer configured sounding reference signal (SRS), physical uplink control channel (PUCCH), physical uplink shared channel (PUSCH), or physical random access channel (PRACH) on the first symbol.

In yet another example, when the first symbol satisfies a fourth specific condition, the terminal device transmitting a signal or channel scheduled by a downlink control information (DCI) format on the first symbol.

In some examples, the first symbol satisfying the first specific condition includes at least one of examples.

In one example, semi-static TDD configuration information indicating that the first symbol is downlink in the second cell, and the semi-static TDD configuration information indicating that the first symbol is downlink in the first cell, and the first cell being configured with frequency-domain resources for an uplink transmission, and time-domain resources corresponding to the frequency-domain resources not including the first symbol.

In another example, the semi-static TDD configuration information indicating that the first symbol is downlink in the second cell, and the semi-static TDD configuration information indicating that the first symbol is downlink in the first cell, and the first cell being configured with the frequency-domain resources for an uplink transmission, and the time-domain resources corresponding to the frequency-domain resources including the first symbol.

In yet another example, the semi-static TDD configuration information indicating that the first symbol is downlink in the second cell, and the semi-static TDD configuration information indicating that the first symbol is uplink in the first cell, and the second cell being configured with the frequency-domain resources for an uplink transmission, and the time-domain resources corresponding to the frequency-domain resources including the first symbol.

In yet another example, the semi-static TDD configuration information indicating that the first symbol is downlink in the second cell, and the semi-static TDD configuration information indicating that the first symbol is downlink in the first cell, and the second cell being configured with the frequency-domain resources for an uplink transmission, and the time-domain resources corresponding to the frequency-domain resources not including the first symbol.

In yet another example, the semi-static TDD configuration information indicating that the first symbol is downlink in the second cell, and the semi-static TDD configuration information indicating that the first symbol is downlink in the first cell, and the second cell being configured with the frequency-domain resources for an uplink transmission, and the time-domain resources corresponding to the frequency-domain resources including the first symbol.

In yet another example, the semi-static TDD configuration information indicating that the first symbol is uplink in the second cell, and the semi-static TDD configuration information indicating that the first symbol is downlink in the first cell, and the first cell being configured with the frequency-domain resources for an uplink transmission, and the time-domain resources corresponding to the frequency-domain resources not including the first symbol.

In yet another example, the semi-static TDD configuration information indicating that the first symbol is uplink in the second cell, and the semi-static TDD configuration information indicating that the first symbol is downlink in the first cell, and the first cell being configured with the frequency-domain resources for an uplink transmission, and the time-domain resources corresponding to the frequency-domain resources including the first symbol.

In yet another example, the terminal device being configured by a higher layer to transmit an uplink (UL) signal or channel on the first symbol of the first cell, and being indicated by the semi-static TDD configuration information that the first symbol is downlink in the second cell, and the second cell being configured with the frequency-domain resources for an uplink transmission, and the time-domain resources corresponding to the frequency-domain resources not including the first symbol.

In yet another example, the terminal device being configured by the higher layer to transmit the UL signal or channel on the first symbol of the first cell, and being indicated by the semi-static TDD configuration information that the first symbol is downlink in the second cell, and the second cell being configured with the frequency-domain resources for an uplink transmission, and the time-domain resources corresponding to the frequency-domain resources including the first symbol.

In yet another example, the terminal device being configured by the higher layer to transmit a downlink (DL) signal or channel on the first symbol of the first cell, and being indicated by the semi-static TDD configuration information that the first symbol is uplink in the second cell, and the second cell being configured with the frequency-domain resources for an uplink transmission, and the time-domain resources corresponding to the frequency-domain resources not including the first symbol.

In yet another example, the terminal device being configured by the higher layer to transmit downlink DL signals or channels on the first symbol of the first cell, and being indicated by the semi-static TDD configuration information that the first symbol is uplink in the second cell, and the second cell being configured with the frequency-domain resources for an uplink transmission, and the time-domain resources corresponding to the frequency-domain resources including the first symbol.

In some examples, the first symbol satisfying the second specific condition includes at least one of examples.

In one example, semi-static TDD configuration information indicating that the first symbol is downlink in the second cell, and the semi-static TDD configuration information indicating that the first symbol is downlink in the first cell, and the first cell being configured with frequency-domain resources for an uplink transmission, and time-domain resources corresponding to the frequency-domain resources not including the first symbol.

In another example, the semi-static TDD configuration information indicating that the first symbol is downlink in the second cell, and the semi-static TDD configuration information indicating that the first symbol is downlink in the first cell, and the first cell being configured with the frequency-domain resources for an uplink transmission, and the time-domain resources corresponding to the frequency-domain resources including the first symbol.

In yet another example, the semi-static TDD configuration information indicating that the first symbol is downlink in the second cell, and the semi-static TDD configuration information indicating that the first symbol is uplink in the first cell, and the second cell being configured with the frequency-domain resources for an uplink transmission, and the time-domain resources corresponding to the frequency-domain resources not including the first symbol, and In yet another example, the semi-static TDD configuration information indicating that the first symbol is downlink in the second cell, and the semi-static TDD configuration information indicating that the first symbol is uplink in the first cell, and the second cell being configured with the frequency-domain resources for an uplink transmission, and the time-domain resources corresponding to the frequency-domain resources including the first symbol.

In some examples, the first symbol satisfying the third specific condition includes at least one of examples.

In one example, semi-static TDD configuration information indicating that the first symbol is downlink in the second cell, and the semi-static TDD configuration information indicating that the first symbol is downlink in the first cell, and the second cell being configured with frequency-domain resources for an uplink transmission, and time-domain resources corresponding to the frequency-domain resources not including the first symbol.

In another example, the semi-static TDD configuration information indicating that the first symbol is downlink in the second cell, and the semi-static TDD configuration information indicating that the first symbol is downlink in the first cell, and the second cell being configured with the frequency-domain resources for an uplink transmission, and the time-domain resources corresponding to the frequency-domain resources including the first symbol.

In yet another example, the semi-static TDD configuration information indicating that the first symbol is uplink in the second cell, and the semi-static TDD configuration information indicating that the first symbol is downlink in the first cell, and the first cell being configured with the frequency-domain resources for an uplink transmission, and the time-domain resources corresponding to the frequency-domain resources not including the first symbol.

In yet another example, the semi-static TDD configuration information indicating that the first symbol is uplink in the second cell, and the semi-static TDD configuration information indicating that the first symbol is downlink in the first cell, and the first cell being configured with the frequency-domain resources for an uplink transmission, and the time-domain resources corresponding to the frequency-domain resources including the first symbol.

In some examples, the first symbol satisfying the fourth specific condition includes at least one of examples:

In one example, semi-static TDD configuration information indicating that the first symbol is downlink in the first cell, and the first cell being configured with frequency-domain resources for an uplink transmission, and time-domain resources corresponding to the frequency-domain resources not including the first symbol.

In another example, the semi-static TDD configuration information indicating that the first symbol is downlink in the first cell, and the first cell being configured with the frequency-domain resources for an uplink transmission, and the time-domain resources corresponding to the frequency-domain resources including the first symbol.

Some embodiments of the present disclosure provide a method performed by a terminal device, including: performing directional collision handling within a cell among a second set of cells; and performing directional collision handling between cells among the second set of cells.

In some examples, the second set of cells includes at least one of: a cell configured with a parameter indicating enabling of directional collision handling, a cell configured for the terminal device, cells with a same band, and a cell in a same band as a reference cell.

In some examples, the performing of the directional collision handling between the cells among the second set of cells includes: performing the directional collision handling between cells in a same band among the second set of cells; and performing the directional collision handling between cells across different bands among the second set of cells.

Some embodiments of the present disclosure provide a terminal device comprising: a transceiver configured to transmit and receive signals; a controller coupled with the transceiver and configured to perform the aforementioned methods.

Some embodiments of the present disclosure provide a base station, comprising: a transceiver configured to transmit and receive signals; a controller coupled with the transceiver and configured to perform the aforementioned methods.

The method and the device of the present disclosure improve the flexibility and reliability of the wireless communication system.

According to embodiments of the present disclosure, at least a part of the terminal device and the base station (e.g., modules or their functions) or the methods (e.g., operations or steps) may be implemented as instructions stored in a computer-readable storage medium (e.g., memory) in the form of program modules, for example. When executed by a processor or controller, the signalings may enable the processor or controller to perform corresponding functions. The computer-readable media may include, for example, hard disk, floppy disk, magnetic media, optical recording media, DVD, magneto-optical media. The signalings may include code created by a compiler or code executable by an interpreter. The terminal device and the base station according to various embodiments of the present disclosure may include at least one or more of the above components, some of which may be omitted, or other additional components. Operations performed by modules, programming modules or other components according to various embodiments of the present disclosure may be performed sequentially, in parallel, repeatedly or heuristically, or at least some operations may be performed in a different order or omitted, or other operations may be added.

What has been described above is only exemplary embodiments of the present disclosure, and is not intended to limit the scope of protection of the present disclosure, which is determined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, configuration information configuring multiple cells in a band for the UE; and
   determining a reference cell for a first symbol according to at least one cell from the multiple cells,
   wherein, in case that the first symbol is configured for an uplink transmission in the at least one cell, the at least one cell includes at least one frequency-domain resource allocated for a downlink reception,
   wherein the reference cell is identified as a cell with a smallest cell identifier (ID) among the at least one cell, and
   wherein the reference cell is associated with a directional collision within each cell.

2. The method of claim 1, in case that the first symbol is configured for the downlink reception in the at least one cell, the at least one cell includes at least one frequency-domain resource allocated for the uplink transmission.

3. The method of claim 1, wherein the reference cell for the first symbol is determined based on another cell different from the at least one cell among the multiple cells.

4. The method of claim 1, wherein a time-domain resource corresponding to the at least one frequency-domain resource includes the first symbol.

5. A method performed by a base station in a wireless communication system, the method comprising:
   transmitting, to a user equipment (UE), configuration information configuring multiple cells in a band for the UE,
   wherein at least one cell from the multiple cells is used to determine a reference cell for a first symbol,
   wherein, in case that the first symbol is configured for an uplink reception in the at least one cell, the at least one cell includes at least one frequency-domain resource allocated for a downlink transmission,
   wherein the reference cell is identified as a cell with a smallest cell identifier (ID) among the at least one cell, and
   wherein the reference cell is associated with a directional collision within each cell.

6. The method of claim 5, in case that the first symbol is configured for the downlink transmission in the at least one cell, the at least one cell includes at least one frequency-domain resource allocated for the uplink reception.

7. The method of claim 5, wherein the reference cell for the first symbol is determined based on another cell different from the at least one cell among the multiple cells.

8. The method of claim 5, wherein a time-domain resource corresponding to the at least one frequency-domain resource includes the first symbol.

9. A user equipment (UE) in a wireless communication system, the UE comprising:
   a transceiver; and
   a controller coupled with the transceiver, and configured to:
      receive, from a base station, configuration information configuring multiple cells in a band for the UE, and
      determine a reference cell for a first symbol according to at least one cell from the multiple cells,
   wherein, in case that the first symbol is configured for an uplink transmission in the at least one cell, the at least one cell includes at least one frequency-domain resource allocated for a downlink reception,
   wherein the reference cell is identified as a cell with a smallest cell identifier (ID) among the at least one cell, and
   wherein the reference cell is associated with a directional collision within each cell.

10. The UE of claim 9, in case that the first symbol is configured for the downlink reception in the at least one cell, the at least one cell includes at least one frequency-domain resource allocated for the uplink transmission.

11. The UE of claim 9, wherein the reference cell for the first symbol is determined based on another cell different from the at least one cell among the multiple cells.

12. The UE of claim 9, wherein a time-domain resource corresponding to the at least one frequency-domain resource includes the first symbol.

13. A base station in a wireless communication system, the base station comprising:
   a transceiver; and
   a controller coupled with the transceiver, and configured to:
      transmit, to a user equipment (UE), configuration information configuring multiple cells in a band for the UE,
   wherein at least one cell from the multiple cells is used to determine a reference cell for a first symbol,
   wherein, in case that the first symbol is configured for an uplink reception in the at least one cell, the at least one cell includes at least one frequency-domain resource allocated for a downlink transmission,
   wherein the reference cell is identified as a cell with a smallest cell identifier (ID) among the at least one cell, and
   wherein the reference cell is associated with a directional collision within each cell.

14. The base station of claim 13, in case that the first symbol is configured for the downlink transmission in the at least one cell, the at least one cell includes at least one frequency-domain resource allocated for the uplink reception.

15. The base station of claim 13, wherein the reference cell for the first symbol is determined based on another cell different from the at least one cell among the multiple cells.

16. The base station of claim 13, wherein a time-domain resource corresponding to the at least one frequency-domain resource includes the first symbol.

* * * * *